United States Patent [19]

Kono et al.

[11] Patent Number: 4,588,633
[45] Date of Patent: May 13, 1986

[54] POLYETHYLENE MICROPOROUS MEMBRANE OF ULTRA HIGH MOLECULAR WEIGHT

[75] Inventors: Koichi Kono; Shoichi Mori; Kenji Miyasaka; Jyoichi Tabuchi, all of Saitama, Japan

[73] Assignee: Toa Nenryo Kogyo Kabushiki Kaisha, Tokyo, Japan

[21] Appl. No.: 728,806

[22] Filed: Apr. 29, 1985

[30] Foreign Application Priority Data

Apr. 27, 1984 [JP]  Japan ................................. 59-83872

[51] Int. Cl.$^4$ ............................................. B32B 27/32
[52] U.S. Cl. .................................. 428/220; 428/315.5; 521/143
[58] Field of Search ................... 428/220, 315.5, 315.7, 428/315.9; 521/143

[56] References Cited

U.S. PATENT DOCUMENTS 4,539,256  9/1985  Shipman ........................... 428/315.5

Primary Examiner—William J. Van Balen
Attorney, Agent, or Firm—Wenderoth, Lind & Ponack

[57] ABSTRACT

A polyethylene microporous membrane having a thickness of at most 10 μm, a breaking strength of at least 200 kg/cm$^2$ and a porosity of at least 30% is produced by heating and dissolving polyethylene having a weight average molecular weight of at least $5 \times 10^5$ in a solvent, forming a gel sheet from the resulting solution, subjecting the gel sheet to a solvent removal treatment to adjust the amount of the solvent in the gel sheet to 10 to 80% by weight, heating and stretching the sheet and then removing the residual solvent therefrom.

3 Claims, No Drawings

POLYETHYLENE MICROPOROUS MEMBRANE OF ULTRA HIGH MOLECULAR WEIGHT

BACKGROUND OF THE INVENTION

1. Field of the Invention

This invention relates to an extremely thin and higher strength microporous membrane of ultrahigh molecular weight polyethylene and a process for the production of the same. "Extremely thin" will hereinafter be referred to as "superthin" in this specification.

2. Description of the Prior Art

Porous materials have been used for various applications, e.g. separators for cells, diaphragms for electrolytic capacitors, various filters, moisture permeable and waterproof clothings, etc., but a thinner thickness and higher strength have lately been required therefor so as to miniaturize or weight-reduce these devices or to improve the performances thereof.

For the production of polyolefin porous materials, there have been proposed, for example, a method comprising mixing a polyolefin with a pore-forming agent consisting of a different polymer or a fine powder to prepare a microdispersion and extracting the pore-forming agent, a phase separation method comprising subjecting a polyolefin to a micro phase separation with a solvent to form a porous structure and a stretching method comprising forming a polyolefin in which different solids are microdispersed and stretching the formed polyolefin to give strain thereto, whereby the polyolefin and different solids are subjected to interfacial breakage to make micropores. However, these methods use polyolefins each having a molecular weight of less than $5 \times 10^5$ and thus have a limit in attaining a superthin membrane with a higher strength by stretching. On the other hand, ultrahigh molecular weight polyolefins are expected to have a higher strength and higher elasticity even in the form of a superthin film, but in actual fact, they have respectively a worse stretchability because of more remarkable interlacement of the molecular chains than the ordinary molecular weight polyolefins. In order to improve this stretchability, for example, a method has been proposed comprising dissolving ultrahigh molecular weight polyethylene in a non-volatile solvent, forming a gel of fiber or film from this solution and then heating and stretching the gel containing the solvent or dry gel from which the solvent has been extracted with a volatile solvent, as described in Japanese Patent Application OPI (Kokai) No. 5228/1983. However, the gel having a porous network structure swelled highly with a non-volatile solvent has the drawbacks that when it is stretched in two directions, a higher orientation stretching is impossible, the network structure is enlarged to cause a tendency of breakage and the resulting film has a lower strength and larger diameter pores formed. When the gel is subjected to extraction of the non-volatile solvent with a volatile solvent and then dried, on the contrary, the network structure shrinks to be compacted, but the base stock sheet tends to bend by the non-uniform evaporation of the volatile solvent and a high ratio stretching cannot be effected due to the shrinking and compacting.

SUMMARY OF THE INVENTION

It is an object of the present invention to provide a superthin microporous membrane of ultrahigh molecular weight polyethylene with a higher strength.

It is another object of the present invention to provide a process for producing a superthin microporous membrane of ultrahigh molecular weight polyethylene with a higher breaking strength, whereby the above described disadvantages of the prior art can be overcome.

These objects can be attained by (1) a polyethylene microporous membrane consisting of polyethylene having a weight avarage molecular weight of at least $5 \times 10^5$, and having a thickness of at most 10 $\mu$m, preferably 0.1 to 10 $\mu$m, more preferably 0.3 to 6 $\mu$m, a breaking strength of at least 200 kg/cm$^2$ and porosity of at least 30%, preferably 30 to 95%, more preferably 50 to 90%, and (2) a process for the production of a polyethylene microporous membrane having a thickness of at most 10 $\mu$m, preferably 0.1 to 10 $\mu$m, more preferably 0.3 to 6 $\mu$m, a breaking strength of at least 200 kg/cm$^2$ and porosity of at least 30%, preferably 30 to 95%, more preferably 50 to 90%, which comprises heating and dissolving polyethylene having a weight average molecular weight of at least $5 \times 10^5$ in a solvent, forming a gel sheet from the resulting solution, subjecting the gel sheet to a solvent removal treatment to adjust the amount of the solvent in the gel sheet to 10 to 80% by weight, heating and stretching the sheet and then removing the residual solvent therefrom.

DETAILED DESCRIPTION OF THE INVENTION

The process for producing a polyethylene microporous membrane according to the present invention will now be illustrated.

The polyethylene used in the present invention is a crystalline polyethylene of ultrahigh molecular weight, consisting of homopolymer of ethylene or a copolymer of ethylene with at most 10 mol % of one or more α-olefins. The weight average molecular weight should be at least $5 \times 10^5$, preferably $5 \times 10^5$ to $15 \times 10^6$, more preferably $1 \times 10^6$ to $10 \times 10^6$. When using a polyethylene with a weight average molecular weight of less than $5 \times 10^5$, a superthin microporous membrane with a higher strength cannot be obtained according to the present invention.

The polyethylene solution used as a raw material in the present invention is prepared by heating and dissolving the above described polyethylene having a weight average molecular weight of at least $5 \times 10^5$ in a solvent. As this solvent, there can be used any solvents capable of dissolving the polyethylene sufficiently, for example, aliphatic or cyclic hydrocarbons such as nonane, decane, undecane, dodecane, decalin and paraffin oils or mineral oil fractions having boiling points corresponding thereto. For the purpose of obtaining a gel sheet whose solvent content is stable, non-volatile solvents such as paraffin oils are preferable. The heating and dissolving is generally carried out with agitation at a temperature at which the polyethylene is completely dissolved in the solvent. The temperature, depending upon the variety of the solvent used, ranges generally 140° to 250° C. The concentration of the polyethylene solution is preferably 1 to 10% by weight. Furthermore, it is preferable to add an antioxidant so as to prevent the polyethylene from deterioration due to oxidation during the heating and dissolving.

The heated polyethylene solution is then extruded from a suitably selected die in the form of a sheet or flowed and spread on a support and cooled at a rate of at least 50° C./min to a temperature of at most the gelling temperature, preferably 15° to 25° C. using a water bath, air bath or solvent for the purpose of gelling. The gel sheet is generally formed in a thickness of 0.1 to 5 mm. This gel sheet is swelled with the solvent used for dissolving the polyethylene and accordingly, requires a solvent removal treatment.

The solvent removal treatment is generally carried out by immersing the gel sheet in a readily volatile solvent, extracting the residual solvent and drying, by compressing, by heating or by combining two or more of these methods, but above all, the method of extracting with a readily volatile solvent is preferable wherein the solvent can be removed without marked deformation of the structure of the gel sheet. As the readily volatile solvent, there can be used hydrocarbons such as pentane, hexane, heptane and the like; chlorinated hydrocarbons such as methylene chloride, carbon tetrachloride and the like; fluorinated hydrocarbons such as ethylene trifluoride; ethers such as diethyl ether, dioxane and the like; and alcohols such as methanol, ethanol, propanol and the like. These solvents are suitably chosen depending upon the solvent used for dissolving the polyethylene and can be used individually or in combination.

The amount of the solvent removed from the gel sheet should so be adjusted that the amount of the solvent remaining in the gel sheet in 10 to 80% by weight, preferably 40 to 80% by weight, since if less than 10% by weight, the network structure in the gel sheet is decreased and compacting excessively proceeds so that stretching cannot be carried out with a high magnification or ratio and a superthin membrane with a higher strength cannot be obtained, while if more than 80% by weight, the gel sheet is so excessively swelled that a high orientation stretching cannot be carried out, breaking tends to occur and the resulting microporous membrane has a lower strength and a larger mean pore diameter. This is not favourable. The amount of the solvent in the gel sheet can be controlled by the amount of a readily volatile solvent to be contacted with the gel sheet or the pressure during compressing.

In the solvent removal treatment of the gel sheet with a readily volatile solvent, the gel sheet shrinks and bends in three axial directions with evaporation of the readily volatile solvent replaced in the gel sheet. Therefore, in order to prevent this phenomenon and to obtain a base stock sheet having smoothness and a smaller shrinkage in two directions (longitudinal, lateral) which can be stretched uniformly with a high ratio or magnification, it is preferable to allow the gel sheet to shrink selectively in the thickness direction. Preferably, the shrinkage is at least 50%, more preferably at least 70% in the thickness direction and at most 20% in the two directions. The shrinkage of the gel sheet selectively in the thickness direction can be accomplished, for example, by evaporating the readily volatile solvent while adhering the gel sheet tightly to a support, holding it from the two directions or holding it between porous plates.

The stretching is carried out biaxially with a predetermined ratio or magnification by heating the base stock sheet of the gel sheet subjected to the solvent removal treatment and stretching biaxially using the ordinary tenter method, rolling method, pressing method or these methods in combination. The biaxial stretching can either be carried out simultaneously or in sequence.

The heating temperature is preferably in the range of from the α-dispersion temperature to the crystal melting point of the polyethylene of the base stock sheet, particularly, 90° to 140° C., more particularly 110° to 130° C. If the heating temperature is lower than the crystal α-dispersion temperature, softening of the resin is insufficient so that the sheet tends to be broken during stretching and the stretching cannot be carried out with a higher ratio, while if higher than the crystal melting point, the sheet is too melted to be stretched.

The stretching ratio or magnification, depending upon the thickness of the base stock sheet, is at least 2, preferably at least 5 in one direction, and at least 10, preferably at least 25 in the surface direction. If the surface ratio or magnification is less than 10, a membrane with a higher porosity and higher strength cannot be obtained.

The thus stretched microporous membrane is immersed in the above described readily volatile solvent to extract and remove the residual solvent, then subjected to evaporation of the solvent and dried. The extraction of the solvent should be carried out in such a manner that the solvent content in the microporous membrane be less than 1% by weight.

Therefore, the present invention provides a polyethylene microporous membrane having a thickness of 0.1 to 10 μm, a breaking strength of at least 200 kg/cm$^2$, a porosity of 30 to 95% and a mean pore diameter of 0.1 to 4 μm, whose thickness and strength cannot be obtained in the prior art processes. The polyethylene microporous membrane of the present invention is available for various uses, for example, separators for cells, diaphragms for electrolytic capacitors, various filters, porous membrane for moisture permeable and waterproof clothings, etc., because of its extremely thin thickness and higher strength. According to the present invention, the miniaturization or weight reduction of these devices and the improvement of properties or performances of these materials can effectively be accomplished.

The following examples are given in order to illustrate the present invention in detail without limiting the same, in which the following test methods are employed:

(1) Film Thickness: Measurement of cross section of membrane using scanning electron microscope
(2) Tensile Modulus: According to ASTM D 882
(3) Breaking Strength: According to ASTM D 882
(4) Elongation at Breaking: According to ASTM D 882
(5) Porosity, Mean Pore Diameter: Measured by mercury porosimeter

EXAMPLE 1

To 100 parts by weight of a mixture of liquid paraffin (64 cst/40° C.) containing 4.0% by weight of polyethylene having a weight average molecular weight ($\overline{Mw}$) of $2 \times 10^6$ were added 0.125 part by weight of 2,6-di-t-butyl-p-cresol and 0.25 part by weight of tetrakis (methylene-3-(3,5-di-t-butyl-4-hydroxyphenyl)-propionate)methane, as antioxidants and mixed. The resulting mixed solution was charged in an autoclave equipped with a stirrer and heated at 200° C. with agitation for 90 minutes to form a homogeneous solution.

This solution was charged in a heated metal mold, rapidly cooled to 15° C. and formed into a gel sheet with a thickness of 2 mm. This gel sheet was immersed in 250 ml of methylene chloride for 60 minutes, and then subjected to evaporation of the methylene chloride while putting in on a smooth plate, thus obtaining a base stock sheet containing 62.2% by weight of liquid paraffin and having a shrinkage of 81.2% in the thickness direction.

The resulting base stock sheet was cut in a size of 9×9 cm, set in a biaxial stretching machine and then subjected to simultaneous biaxial stretching at a temperature of 125° C. and a rate of 30 cm/min with a stretching ratio of 10×10. The thus stretched membrane was washed with methylene chloride to extract and remove the residual liquid paraffin and then dried to obtain a polyethylene microporous membrane having properties shown in Table 1.

EXAMPLES 2-6

The procedure of Example 1 was repeated except that the gel sheet obtained in Example 1 was subjected to membrane making under conditions shown in Table 1, thus obtaining polyethylene microporous membranes having properties shown in Table 1.

EXAMPLE 7

The procedure of Example 1 was repeated except that a gel sheet with a thickness of 1 mm was formed by the use of a metal mold with a thickness of 1 mm, thus obtaining a polyethylene microporous membrane with properties shown in Table 1.

obtaining a polyethylene microporous membrane having properties shown in Table 1.

EXAMPLES 11 AND 12

The procedure of Example 1 was repeated except that the gel sheet obtained in Example 1 was stretched in sequence under conditions shown in Table 1, thus obtaining polyethylene microporous membranes having properties shown in Table 1.

COMPARATIVE EXAMPLES 1 AND 2

The procedure of Example 1 was repeated except that the amount of the liquid paraffin in the gel sheet obtained in Example 1 was adjusted to 8.1% by weight or 87.0% by weight and the membrane making was carried out under conditions shown in Table 1, thus obtaining polyethylene membranes shown in Table 1.

COMPARATIVE EXAMPLE 3

The procedure of Example 1 was repeated except forming a gel sheet by the use of a solution of 16% by weight of polyethylene with an ordinary molecular weight ($\overline{Mw}$ 13.5×10$^4$) in liquid paraffin instead of the ultrahigh molecular weight polyethylene used in Example 1 and effecting the membrane making under conditions shown in Table 1. However, the membrane was broken in the stretching with a higher magnification and accordingly, superthin microporous membrane could not be obtained.

TABLE 1

| | Membrane Making Conditions | | | | Properties of Polyethylene Microporous Membrane | | | | | |
|---|---|---|---|---|---|---|---|---|---|---|
| Example | Solvent in Gel Sheet (wt %) | Shrinkage of Gel Sheet in Thickness Direction (%) | Stretching Temperature (°C.) | Stretching Ratio* (°C.) | Film Thickness (μm) | Tensile Modulus (kg/cm$^2$) | Breaking Strength (kg/cm$^2$) | Elongation at Breaking (%) | Porosity (%) | Mean Pore Diameter (μm) |
| Example | | | | | | | | | | |
| 1 | 62.2 | 81.2 | 125 | 10 × 10 | 2.4 | 3970 | 1880 | 54.7 | 78.0 | 2.5 |
| 2 | 20.3 | 94.5 | 130 | 5 × 5 | 5.6 | 318 | 234 | 566 | 32.2 | 0.26 |
| 3 | 67.2 | 84.5 | 130 | 7 × 7 | 4.0 | 552 | 331 | 501 | 40.4 | 1.0 |
| 4 | 67.2 | 84.5 | 130 | 9 × 9 | 2.4 | 552 | 256 | 304 | 50.8 | 1.5 |
| 5 | 78.0 | 80.0 | 120 | 10 × 10 | 1.6 | 6340 | 2030 | 35.3 | 81.2 | 0.46 |
| 6 | 68.0 | 85.0 | 130 | 10 × 10 | 0.6 | 705 | 312 | 482 | 52.8 | 3.0 |
| 7 | 62.2 | 81.2 | 120 | 10 × 10 | 1.2 | 1680 | 1370 | 53.0 | 75.0 | 1.8 |
| 8 | 46.3 | 89.2 | 130 | 10 × 10 | 0.8 | 1800 | 1200 | 31.7 | 64.6 | 1.8 |
| 9 | 40.5 | 90.1 | 130 | 10 × 10 | 0.7 | 2040 | 1060 | 30.0 | 60.2 | 2.5 |
| 10 | 59.0 | 85.0 | 120 | 10 × 10 | 1.0 | 1940 | 1350 | 64.4 | 68.0 | 2.0 |
| 11 | 42.5 | 88.1 | 130 | 10 × 5 | 3.8 | 630** | 350** | 315** | 42.7 | 0.22 |
| | | | | | | 580*** | 280*** | 405*** | | |
| 12 | 62.2 | 81.2 | 125 | 10 × 10 | 2.0 | 4790** | 1970** | 41.7** | 77.8 | 1.2 |
| | | | | | | 3220*** | 1360*** | 48.0*** | | |
| Comparison | | | | | | | | | | |
| 1 | 8.1 | 95.6 | 130 | 5 × 5 (broken) | — | — | — | — | — | — |
| 2 | 87.0 | 80.0 | 130 | 10 × 10 | 1.0 | 106 | 75 | 850 | 58.1 | 5.0 |
| 3 | 47.4 | 82.5 | 130 | 5 × 5 (broken) | — | — | — | — | — | — |

Note:
*longitudinal × lateral
**longitudinal
***lateral

EXAMPLES 8 AND 9

The procedure of Example 1 was repeated except that the gel sheet obtained in Example 1 was rolled to remove partly the liquid paraffin, immersed in methylene chloride to remove the solvent and then stretched under conditions shown in Table 1, thus obtaining polyethylene microporous membranes having properties shown in Table 1.

EXAMPLE 10

The procedure of Example 1 was repeated except that the concentration of the polyethylene solution was adjusted to 2.0% by weight and the membrane making was carried out under conditions shown in Table 1, thus

What is claimed is:

1. A polyethylene microporous membrane consisting of polyethylene having a weight average molecular weight of at least 5×10$^5$, and having a thickness of at most 10 μm, a breaking strength of at least 200 kg/cm$^2$ and a porosity of at least 30%.

2. The polyethylene microporous membrane of claim 1, wherein the thickness is 0.1 to 10 μm, the breaking strength is at least 200 kg/cm$^2$ and the porosity is 30 to 95%.

3. The polyethylene microporous membrane of claim 1, wherein the weight average molecular weight is 1×10$^6$ to 10×10$^6$.

* * * * *